(12) United States Patent
Reuter (10) Patent No.: US 10,794,540 B2
(45) Date of Patent: Oct. 6, 2020

(54) APPARATUS AND METHOD FOR APPLYING A FLUID TO AN OBJECT SURFACE

(71) Applicant: Marco Systemanalyse und Entwicklung GmbH, Dachau (DE)

(72) Inventor: Martin Reuter, Dachau (DE)

(73) Assignee: Marco Systemanalyse und Entwicklung GmbH, Dachau (DE)

( * ) Notice: Subject to any disclaimer, the term of this patent is extended or adjusted under 35 U.S.C. 154(b) by 299 days.

(21) Appl. No.: 15/783,952

(22) Filed: Oct. 13, 2017

(65) Prior Publication Data

US 2018/0106428 A1    Apr. 19, 2018

(30) Foreign Application Priority Data

Oct. 14, 2016   (DE) .......................... 10 2016 119 627

(51) Int. Cl.
| | | |
|---|---|---|
| *B05C 11/10* | (2006.01) | |
| *F17C 13/02* | (2006.01) | |
| *F16K 31/04* | (2006.01) | |
| *F16K 31/42* | (2006.01) | |

(Continued)

(52) U.S. Cl.
CPC .......... *F17C 13/02* (2013.01); *B05C 11/1015* (2013.01); *B05C 11/1034* (2013.01); *F16K 31/046* (2013.01); *F16K 31/423* (2013.01); *F17C 13/04* (2013.01); *B05C 5/0216* (2013.01); *B05C 5/0225* (2013.01)

(58) Field of Classification Search
None
See application file for complete search history.

(56) References Cited

U.S. PATENT DOCUMENTS

| 5,505,777 A | 4/1996 | Ciardella et al. |
| 6,063,339 A | 5/2000 | Tisone et al. |
| 8,284,795 B2 | 10/2012 | Peeters et al. |

(Continued)

FOREIGN PATENT DOCUMENTS

| CN | 1289271 A | 3/2001 |
| CN | 1692991 A | 11/2005 |

(Continued)

OTHER PUBLICATIONS

Examination Report, dated Oct. 16, 2018, from the corresponding Japanese Application No. 2017-193148 (seven pages).

(Continued)

*Primary Examiner* — Charles Capozzi
(74) *Attorney, Agent, or Firm* — Kilpatrick Townsend & Stockton LLP (57) ABSTRACT

An apparatus for applying a fluid to an object surface comprises a metering valve, an actuator for moving the metering valve relative to the object surface in at least one spatial direction, and an electronic control device that is in signal communication with the metering valve and the actuator and that is configured to move the metering valve along a predefined metering path and to open it once or a multiple of times within the metering path for a fluid dispensing. The electronic control device comprises means for a time synchronization of the movement of the actuator, on the one hand, and of the opening and closing of the metering valve, on the other hand.

11 Claims, 5 Drawing Sheets

(51) Int. Cl.
*F17C 13/04* (2006.01)
*B05C 5/02* (2006.01)

(56) References Cited

U.S. PATENT DOCUMENTS

| | | | |
|---|---|---|---|
| 2002/0038822 A1 | 4/2002 | Suzuki et al. | |
| 2004/0072364 A1 | 4/2004 | Tisone et al. | |
| 2005/0241576 A1 | 11/2005 | Gaon et al. | |
| 2005/0286424 A1 | 12/2005 | Peeters et al. | |
| 2006/0238587 A1* | 10/2006 | Horsnell | B41J 3/4078 |
| | | | 347/100 |
| 2008/0088781 A1 | 4/2008 | Jung et al. | |
| 2008/0099515 A1 | 5/2008 | Szuch | |
| 2009/0016475 A1* | 1/2009 | Rischar | H04J 3/0697 |
| | | | 375/356 |
| 2013/0284088 A1 | 10/2013 | Takayama | |
| 2013/0327269 A1 | 12/2013 | Suhara | |

FOREIGN PATENT DOCUMENTS

| | | |
|---|---|---|
| CN | 1716907 A | 1/2006 |
| CN | 101162321 A | 4/2008 |
| CN | 103157568 A | 6/2013 |
| CN | 203124215 U | 8/2013 |
| DE | 600 18 175 T2 | 8/2005 |
| DE | 10 2007 048 651 A1 | 4/2008 |
| DE | 10 2013 006 866 A1 | 10/2013 |
| EP | 0 864 370 A1 | 9/1998 |
| JP | H05-111658 A | 5/1993 |
| JP | H11-262713 A | 9/1999 |
| JP | 2002-500098 A | 1/2002 |
| JP | 2007-253063 A | 10/2007 |
| JP | 2008-229421 A | 10/2008 |
| WO | 99/34931 A1 | 7/1999 |

OTHER PUBLICATIONS

German search report dated Jul. 4, 2017 in corresponding German patent application No. 10 2016 119 627.4 (eight pages).
Chinese Examination Report in related Chinese Patent Application No. 2019022701799170 dated Mar. 4, 2019 (eight pages).

* cited by examiner

APPARATUS AND METHOD FOR APPLYING A FLUID TO AN OBJECT SURFACE

This application claims priority to German Application No. 102016119627.4, filed Oct. 14, 2016, the disclosure of which is incorporated by reference herein.

The present invention relates to an apparatus for applying a fluid to an object surface having a metering valve that is connectable to a fluid source and is to open and close in response to control signals, having an actuator for moving the metering valve relative to the object surface in at least one spatial direction, and having an electronic control device that is in signal communication with the metering valve and the actuator and that is configured to move the metering valve along a predefined metering distance and to open it once or a multiple of times within the metering path for a fluid dispensing.

Such apparatus are also called "metering systems" and are in particular used for an automated application of pasty liquids such as adhesives to components. It is frequently desired to apply the fluid along a line or contour of the component. For this purpose, the actuator moves the metering valve along the corresponding line or contour while the metering valve is simultaneously opened. The actuator is preferably configured to move the metering valve in two or three spatial axes.

In conventional systems, the movement sequence of the actuator follows a predefined program while the opening and closing of the metering valve follows a separate program independent thereof. No report of the actuator on when the relevant positioning head is located at which position is made to the metering control. This can result in unwanted irregularities in the positioning and distribution of the fluid in specific applications. It is particularly problematic when the actuator is provided with a position measuring system and with a regulator. Since the regulator attempts to correct the deviation from a desired position, the time sequence of the movement is not reliable.

It is an object of the invention to enable a more exact metering with simple means in apparatus of the named kind.

The object is satisfied by an apparatus having the features of claim 1.

In accordance with the invention the electronic control device comprises means for a time synchronization of the movement of the actuator, on the one hand, and of the opening and closing of the metering valve, on the other hand. It is possible to match the opening procedures of the metering valve exactly with the movement sequence of the actuator based on the time synchronization. An improved monitoring of the metering process is thereby achieved and the positioning accuracy of the applied fluid drops or fluid paths is increased. It is of advantage in this respect that a time synchronization can be effected relatively simply. It is in particular not necessary that the actuator continuously reports the position of its positioning head to the metering control.

Further developments of the invention can be seen from the dependent claims, from the description and from the enclosed drawings.

The electronic control device is preferably configured to carry out a fixed association between the movement of the actuator, on the one hand, and the opening and closing of the metering valve, on the other hand with reference to the uniform time axis prepared by the time synchronization. A spatial coordination between the actuator movement and the valve function can in particular be carried out via the consideration of time, preferably along the total metering path and in all phases of the metering procedure. A particularly exact and reproducible metering thereby results. It is in particular possible to plan all the opening and closing procedures of the metering valve along the time axis, that is to provide a time-based control of the metering system. With a time-based control, the control device plans how far the actuator travels in the next time unit. The control device plans the individual valve openings along this path section for the metering valve. A correction by delay is in this respect possible in a simple manner by displacing the respective times relative to one another. Such a time-based control is substantially simpler to effect than a control that is based on a polling of positions or in which the opening and closing procedures of the metering valve are directed in a position-dependent manner.

Provision can be made that the metering valve is configured to dispense single drops of the fluid, with the electronic control device being configured to direct the application of single drops at fixedly predefined metering positions with reference to the uniform time axis. The metering valve can in particular be designed as a so-called jet valve. While conventionally no particular importance is attached to the positions of single drops during the metering along a metering path, an embodiment of the invention provides fixedly predefining the positions of the single drops over the uniform time axis. It has namely been recognized that significant advantages with respect to the fluid distribution can be achieved in this manner.

The electronic control device can in particular be configured to direct a uniform distribution of single drops over the metering path. This is possible because the positions of all the single drops can be exactly planned in advance on the basis of the time synchronization of the actuator movement and the valve function. Spotty accumulations of fluid are avoided with a uniform distribution of single drops over the metering path as are equally spots with a lack of a fluid application.

A specific embodiment provides that the electronic control device is configured to stretch or compress a spatial distance predefined as an input value between the single drops while taking account of the path length of the metering path as required such that a uniform distribution results. The control device can make provision over the uniform time axis that the stretched or compressed spacing is observed.

The electronic control device can be configured to take account of a metering delay on the directing of the application of single drops at fixedly predefined metering positions. "Metering delay" is to be understood as the time lag between the control signal output for the valve opening and the incidence of the corresponding fluid drop on the object surface. The time lag is substantially composed of the valve opening cycle—that is the opening time of the valve and the duration of the closing flank—and the flight time of the drop. Both times are typically constant for a predefined metering process. Adhesive drops having an identical drop size are, for example, required for the application of a uniform adhesive line, that is the valve opening cycle for these drops is identical. The spatial distance between the metering valve and the object surface is also generally constant. If different valve opening cycles or spatial distances are required within a metering process, they are generally fixed and identical for every repetition of the metering process. They can thus be taken into account by a displacement of the control signal decisive or the metering in the corresponding regions.

An embodiment of the invention provides that the electronic control device comprises a control computer that generates or receives a uniform time signal and is configured to control both the actuator and the metering valve directly using the uniform time signal. In this embodiment, the actuator control and the valve control are inherently time-synchronized.

In accordance with an alternative embodiment of the invention, the electronic control device comprises an actuator control device associated with the actuator and a metering valve control device associated with the metering valve which generate or receive respective individual time signals, with the electronic control device comprising a control computer that is of higher rank than the actuator control device and the metering valve control device and that is configured to synchronize the single time signals. In this embodiment, the time synchronization takes place via a comparison of the time axes of both control devices. The higher ranking control computer can be a user interface computer (HMI computer).

The higher ranking control computer can be configured to carry out the synchronization of the individual time signals by means of a synchronizing network protocol, in particular by means of the precision time protocol (PTP). This allows a particularly simple implementation.

The higher ranking control computer can be configured to output a start signal for a simultaneous start of respective control programs in the actuator control device and in the metering valve control device after the synchronization of the single time signals. The start signal can be based on a control command or on a trigger line.

The higher ranking control computer can furthermore be configured to leave the sequence of the control programs in the actuator control device and in the metering valve control device after the output of the start signal at least substantially uninfluenced. In other words, it is not absolutely necessary that the higher ranking control computer continuously engages into the controls of the individual systems after the synchronization. In specific applications, a one-time synchronization in conjunction with a simultaneous start can rather be sufficient with respect to the desired metering accuracy.

An embodiment of the invention provides that the apparatus comprises an image detection device for monitoring the application of fluid to the object surface and the electronic control device comprises means for the time synchronization of the function of the image detection device and of the movement of the actuator and/or of the opening and closing of the metering valve. If necessary, a light barrier, a transfer system for workpiece carriers and/or further system components can also be integrated in the time synchronization.

The actuator preferably comprises a robot, in particular a three-axial robot.

The invention also relates to a method for applying a fluid to an object surface, in particular by means of an apparatus as described above, with a metering valve being moved along a predefined metering path relative to the object surface by means of an actuator and being opened once or a multiple of times within the metering path.

In accordance with the invention the movement of the actuator is time-synchronized with the opening of the metering valve.

The method in accordance with the invention for applying a fluid to an object surface can in particular comprise steps that correspond to the features of an apparatus as described above.

The invention furthermore applies to a method of determining the metering delay of an apparatus for applying a fluid to an object surface that comprises a metering valve, an actuator for moving the metering valve relative to the object surface, and an electronic control device, in particular an apparatus as described above, wherein (i) the metering valve is respectively moved to and fro once in opposite directions along a test path and a respective single drop is applied to the object surface both on the outward movement and on the return movement, with an opening of the metering valve for the dispensing of the single drop being instructed on the outward movement and on the return movement with a respective predefined time lag relative to the path center of the test path;

(ii) step (i) is carried out for a plurality of test paths at different points of the object surface with a respective different time lag; and (iii) the time lag of that test path is determined as the metering delay in which the spatial distance between the single drop applied on the outward movement and the single drop applied on the return movement is the smallest.

This enables an experimental determination of the metering delay in a simple and reliable manner that can then be taken into account in a metering process to improve the positioning accuracy.

Test paths can be selected that extend in parallel with one another and are preferably evenly spaced apart from one another.

A specific embodiment provides that the positions of the single drops applied on the outward movement are supplemented to form a first line, the positions of the single drops applied on the return movement are supplemented to form a second line and the time lag of that test path is determined as the metering delay that corresponds to the point of intersection between the first line and the second line. The point of intersection can be determined particularly easily and fast, so-to-say "at first glance".

The invention will be described in the following by way of example with reference to the drawings.

Figure 1:
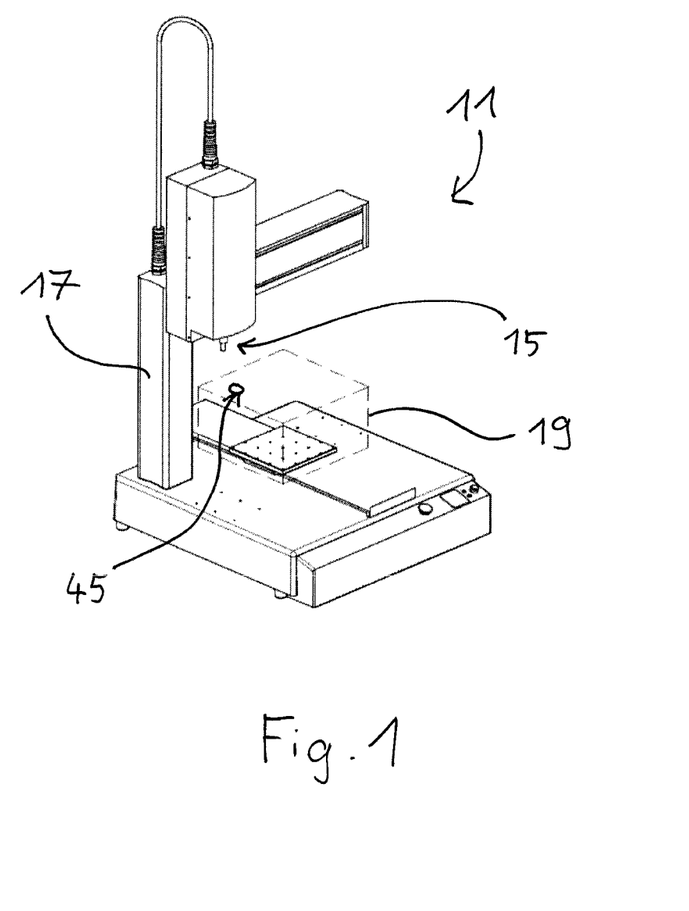
FIG. 1 is a perspective representation of an apparatus in accordance with the invention for applying a fluid to an object surface.

The apparatus 11 shown in FIG. 1 serves for the application of a fluid such as a pasty adhesive to an object surface and comprises a metering valve 15 that is fastened to an actuator 17 in a generally known manner and is movable relative to the surface of a workpiece 19 by a corresponding control of the actuator 17. The metering valve 15 is preferably designed as an electromechanical jet valve and is configured to deposit a single drop 45 on the surface of the workpiece 19 on every opening procedure. An electronic control device not visible in FIG. 1 serves to move the metering valve 15 along a predefined metering path and to open it for a fluid deposition within the metering path as will be stated in more detail in the following.

To enable an exact spatial positioning of the single drops 45 dispensed by the metering valve 15 in a simple manner, the movement of the actuator 17 is time-synchronized in accordance with the invention with the opening of the metering valve 15. This can take place in different manners, as will be described in the following with reference to FIGS. 2 and 3.

Figure 2:
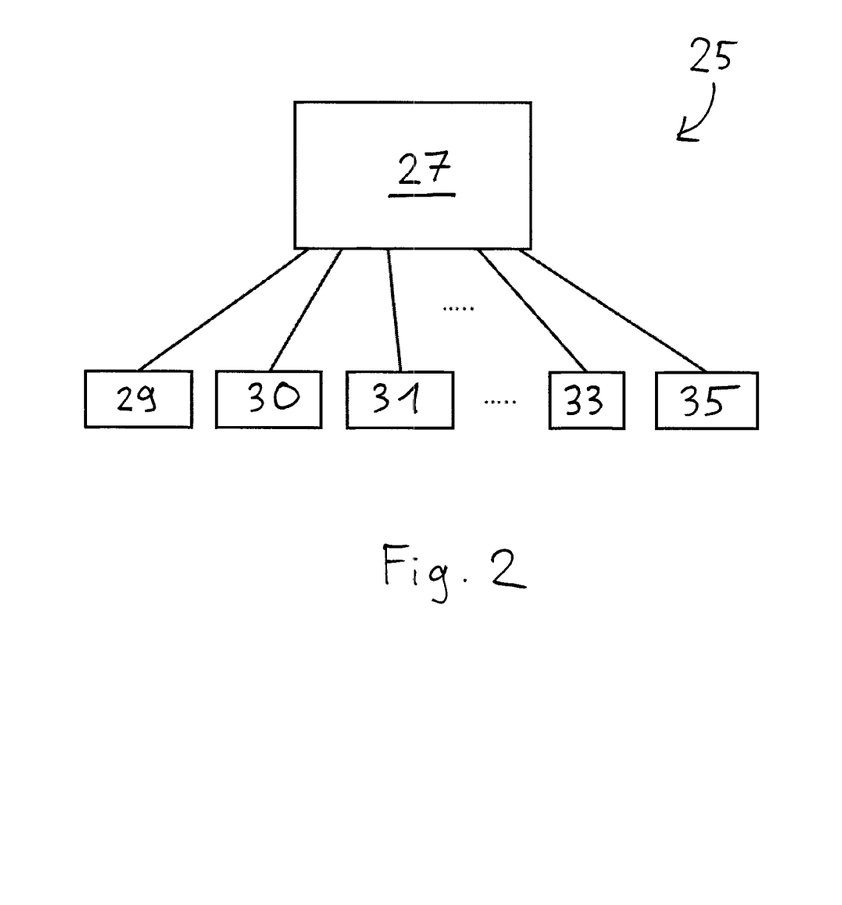
FIG. 2 is a simplified functional diagram of an apparatus in accordance with the invention for applying a fluid to an object surface.

The control device 25 shown in FIG. 2 comprises a control computer 27 that directly controls both the stepper motors 29, 30, 31 of the individual axes of the actuator 17 and the driver module 33 for the metering valve 15 and optionally a camera 35. This means that every single step of the stepper motors 29, 30, 31, every single drop metering, and also every image recording is triggered by a corresponding control command of the common control computer 27. This is advantageous in that the individual steps of the different components are exactly coordinated and synchronized with one another. Due to the direct control by the common control computer 27, the actuator control and the control of the metering system are inherently time-synchronized. Where necessary, the control computer 72 can directly control further system components such as additional stepper motors and cameras, light barriers provided for drop monitoring or axis control and/or a transfer system for workpiece carriers.

Figure 3:
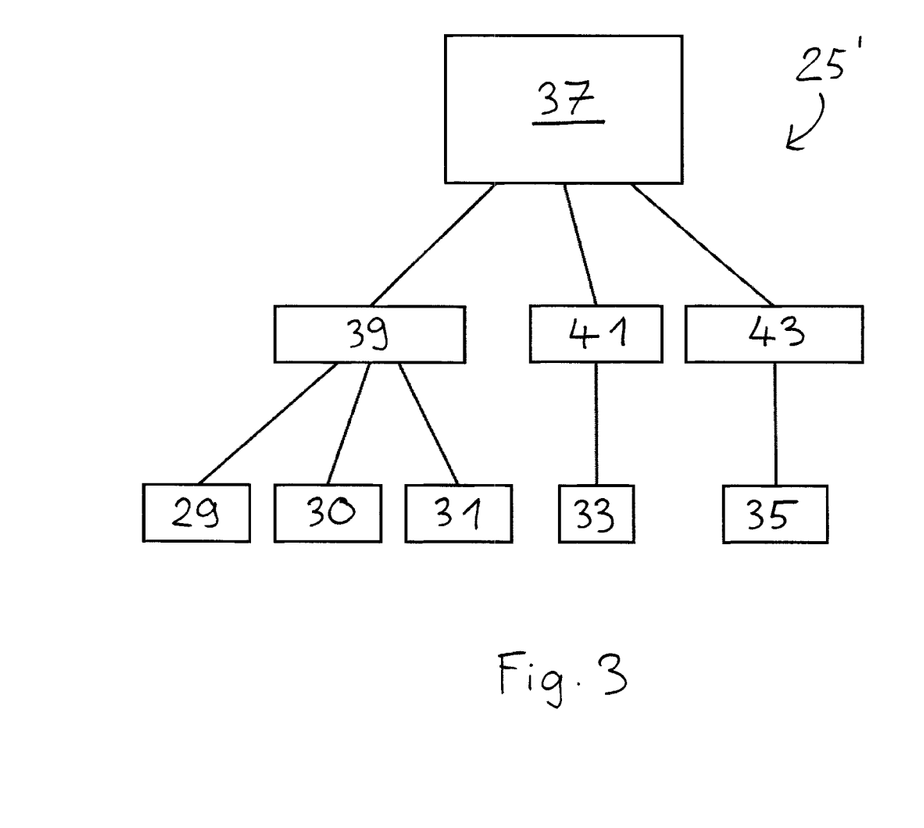
FIG. 3 is a functional diagram of an alternative embodiment of the invention.

The alternatively designed control device 25' shown in FIG. 3 is in particular suitable for metering systems in which no direct access to individual motors or other hardware components is possible. This is the case with metering systems, for example, that are composed of subsystems of different manufacturers and in which the actuator control takes place separately from the control of the metering system. A superordinated or higher ranking computer 37 starts the sequence of a predefined sequence of the individual connected subsystems by means of a control command or via a trigger line. As soon as the actuator 17 has received the start signal, it travels through a preprogrammed path that is composed of a plurality of single steps of the stepper motors 29, 30, 31 of the different axes. This programmed sequence is stored in an associated actuator control device 39. The individual stepper motors 29, 30, 31 are controlled by the actuator control device 39 at a fixed frequency that is preferably between 10 kHz and 50 kHz. This means that the individual steps and thus the complete path the actuator travels through take place on a fixed time axis.

The control of the metering valve 15 by means of a metering valve control device 41 and of the driver module 33 takes place with reference to a fixed time axis. The control of the camera 35 equally takes place by means of a camera control device 43 with reference to a fixed time axis.

The opening and closing times as well as the metering frequency of the metering valve 15 can take place in a predefined manner and according to a preprogrammed sequence. The complete metering process can be composed of different sequences that in turn differ with respect to the opening time and/or the metering frequency, but are run through on a fixed time axis. The time synchronization between the robot movement and metering takes place via an exact synchronization of the time axes of the individual systems. This time synchronization is controlled and regulated by the higher ranking computer 37. In this respect, for example, Ethernet-based processes such as the precision time protocol (PTP) known in the technical sector are used to exactly synchronize the time base of the individual subsystems 39, 41, 43.

The sequences of the individual subsystems 39, 41, 43 are preferably started simultaneously by the higher ranking computer 37. The individual systems can then work through their own sequences independently of one another, but with a synchronized time axis being used as the base. The achievable accuracy of the time synchronization is below 100 μs, which is sufficient for many robot applications and metering applications.

The time synchronization between the actuator movement and the metering enables a particularly easily plannable and controllable metering process. On a lack of time synchronization between the robot movement and the metering, it can, in contrast, occur that the applied adhesive contour deviates from the specification.

Figure 4:
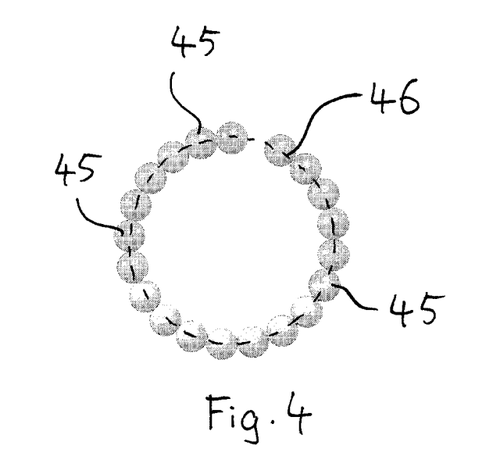
FIG. 4 is a plan view of a metering path of an apparatus for applying a fluid to an object surface.
Figure 5:
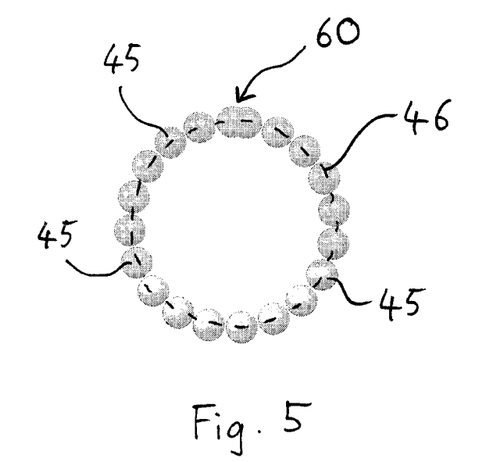
FIG. 5 is a further plan view of a metering path of an apparatus for applying a fluid to an object surface.

A metering path 46 in the form of a closed curve in particular has to be applied in a number of metering processes as shown in FIGS. 4 and 5. For example, a circle has to be applied on the adhesive bonding of camera lenses or a rectangle on the adhesive bonding of housings. In such processes, inhomogeneous metering results can occur without a time synchronization of the robot movement and the valve opening, as is shown in FIGS. 4 and 5. The circular line is either interrupted (FIG. 4) or an adhesive accumulation 60 and thus a broadening of the adhesive contour (FIG. 5) occurs because the start and the end of the metering process overlap.

These problems can be avoided with an integrated and synchronized control of the robot movement and metering, such as is e.g. possible with the electronic control devices 25, 25' in accordance with FIGS. 2 and 3. For this purpose, the control computer 27 or the higher ranking computer 37 directs the single drops 45 along the planned metering path 46 such that all the spatial distances between adjacent single drops 45 are identical. To achieve this, the original spacing of the single drops 45 is stretched or compressed as required. This metering sequence planned along the metering path 46 is then converted to the mentioned fixed time axis. The time sequence of the metering is then either directed directly in the form of individual metering procedures or the newly calculated time sequence of the metering is transferred to the metering control.

In addition, the metering delay, that is the time lag between the control signal decisive for the metering and the incidence of the drop on the workpiece 19, can also be taken into account. An increase in the metering precision is possible by a time displacement of the corresponding control signals by a fixed value. The consideration of the metering delay is possible both with a control device 25 as shown in FIG. 2 and with a control device 25' as shown in FIG. 3.

Figure 6:
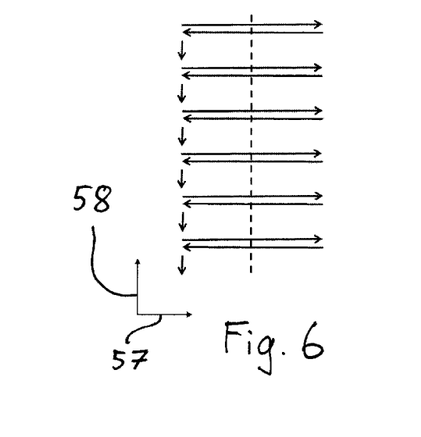
FIG. 6 shows the sequence of a method in accordance with the invention for determining the metering delay of an apparatus for applying a fluid to an object surface.

The metering delay can be experimentally determined in a simple manner using the method described in the following that corresponds to an independent aspect of the invention. In this method, the actuator 17 (FIG. 1) travels through the curve shown in FIG. 6, that is it carries out constant changes of direction in a first direction 57, e.g. along the X axis, and, in steps, a movement in a second direction 58 perpendicular thereto, e.g. along the Y axis. During each outward movement in the first direction 57 and during each return movement opposite the first direction 57, the application of a respective single drop 45 on the workpiece 19 takes place that is preferably a test target or a test workpiece. The metering parameters such as the valve opening cycle and the metering distance in this respect correspond to the planned actual metering process. The time lag between the movement of the actuator 17 and the control signal for the metering is in this respect initially set at least substantially to zero. Specifically, the control signal for the metering initially takes place at exactly half the path distance, which is indicated by the dashed line in FIG. 6. With every step in the second direction 58, the time lag is now somewhat increased, that is the control signal for the metering is output a little earlier with every step. This has the result that the single drops 45 for the outward movement and the single drops 45 for the return movement approximate one another with each step and finally coincide. This is exactly the case when the time lag of the control signal corresponds to the metering delay. If the time lag is increased even further, the single drops 45 for the outward movement and the single drops 45 for the return movement again migrate further apart. The time lag of that outward and return movement in the first direction 57 is determined as the metering delay in which the distance between the single drop 45 applied on the outward movement and the single drop 45 applies on the return movement is the lowest.

Figure 7:
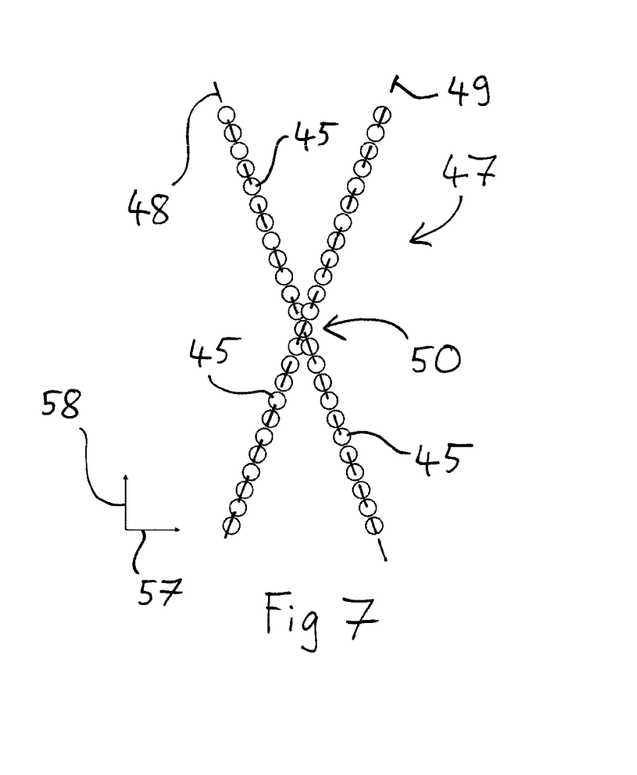
FIG. 7 is a plan view of an object surface onto which fluid drops are applied in accordance with the method shown in FIG. 6.

The X-shaped pattern 47 that is composed of two intersecting lines 48, 49 and that is recognizable in FIG. 7 specifically results. The position of the point of intersection 50 of the two lines 48, 49 indicates that time lag that corresponds to the metering delay so-to-say at first glance. This value can be used in generally any desired metering apparatus that applies in a contactless manner to improve the metering accuracy.

REFERENCE NUMERAL LIST 11 apparatus for applying a fluid to an object surface
15 metering valve
17 actuator
19 workpiece
25, 25' electronic control device
27 control computer
29, 30, 31 stepper motor
33 driver module
35 camera
37 higher ranking computer
39 actuator control device
41 metering valve control device
43 camera control device
45 single drop
46 metering path
47 pattern
48, 49 line
50 point of intersection
57 first direction
58 second direction
60 adhesive accumulation

The invention claimed is:

1. An apparatus for applying a fluid to an object surface, said apparatus comprising:
  a metering valve that is connectable to a fluid source and that is configured to open and close in response to control signals;
  an actuator for moving the metering valve relative to the object surface in at least one spatial direction; and
  an electronic control device that is in signal communication with the metering valve and the actuator and that is configured to move the metering valve along a predefined metering path and to open it once or a multiple of times within the metering path for a fluid dispensing,
  wherein the electronic control device comprises means for a time synchronization of the movement of the actuator and of the opening and closing of the metering valve,
  wherein the electronic control device comprises an actuator control device associated with the actuator and a metering valve control device associated with the metering valve that generate or receive respective single time signals; and wherein the electronic control device comprises a control computer superordinated to the actuator control device and the metering valve control device and that is configured to synchronize the single time signals,
  wherein the superordinated control computer is configured to output a start signal for a simultaneous start of respective control programs in the actuator control device and in the metering valve control device after the synchronization of the single time signals, and
  wherein the superordinated control computer is configured to leave the sequence of the control programs in the actuator control device and in the metering valve control device substantially uninfluenced after the output of the start signal.

2. The apparatus in accordance with claim 1,
  wherein the electronic control device is configured to carry out a fixed association between the movement of the actuator and of the opening and closing of the metering valve on the basis of a uniform time axis provided by the time synchronization.

3. The apparatus in accordance with claim 2,
  wherein the metering valve is configured to dispense single drops of the fluid, with the electronic control device being configured to direct the application of single drops at fixedly predefined metering positions with reference to the uniform time axis.

4. The apparatus in accordance with claim 2,
  wherein the electronic control device is configured to direct a uniform distribution of single drops over the metering path.

5. The apparatus in accordance with claim 4,
  wherein the electronic control device is configured to stretch or compress a spatial distance predefined as an input value between the single drops while taking account of the path length of the metering path as required such that a uniform distribution results.

6. The apparatus in accordance with claim 3,
  wherein the electronic control device is configured to take account of a metering delay on the directing of the application of single drops at fixedly predefined metering positions.

7. The apparatus in accordance with claim 1,
  wherein the electronic control device comprises a control computer that generates or receives a uniform time signal and that is configured to directly control both the actuator and the metering valve with reference to the uniform time signal.

8. The apparatus in accordance with claim 1,
  wherein the superordinated ranking control computer is configured to carry out the synchronization of the individual time signals by means of a synchronizing network protocol.

9. The apparatus in accordance with claim 8,
  wherein the superordinated ranking control computer is configured to carry out the synchronization of the individual time signals by means of a precision time protocol (PTP).

10. The apparatus in accordance with claim 1,
wherein the apparatus comprises an image detection device for monitoring the application of fluid to the object surface, and
wherein the electronic control device comprises means for the time synchronization as a function of the image detection device and the movement of the actuator and/or the opening and closing of the metering valve.

11. The apparatus in accordance with claim 1,
wherein the actuator comprises a robot.

* * * * *